United States Patent [19]

Emoto et al.

[11] Patent Number: 4,687,916
[45] Date of Patent: Aug. 18, 1987

[54] OPTICAL PICK-UP DEVICE FOR BOTH FOCUS AND ERROR TRACKING DETECTION

[75] Inventors: Masami Emoto, Yokohama; Hideo Inuzuka, Kawasaki, both of Japan

[73] Assignee: Ricoh Company, Ltd., Tokyo, Japan

[21] Appl. No.: 754,816

[22] Filed: Jul. 12, 1985

[30] Foreign Application Priority Data

Jul. 13, 1984 [JP] Japan .............................. 59-145632
Aug. 31, 1984 [JP] Japan .............................. 59-180792

[51] Int. Cl.⁴ .............................................. G01J 1/20
[52] U.S. Cl. ........................................ 250/201; 369/45
[58] Field of Search ................... 250/201 DF; 369/44, 369/45, 46

[56] References Cited

U.S. PATENT DOCUMENTS

| | | | |
|---|---|---|---|
| 4,085,423 | 4/1978 | Tsunoda et al. | 250/201 DF |
| 4,275,275 | 6/1981 | Bricot et al. | 369/44 |
| 4,378,491 | 3/1983 | Lehman | 369/45 |
| 4,521,680 | 6/1985 | Andó | 250/201 DF |
| 4,525,625 | 6/1985 | Abe | 250/201 DF |

Primary Examiner—David C. Nelms
Assistant Examiner—William L. Oen
Attorney, Agent, or Firm—Cooper, Dunham, Griffin & Moran

[57] ABSTRACT

An optical pick-up device suitable for use in an optical disk memory system includes a semiconductor laser unit which emits a laser light beam which, in turn, passes through a beam splitter, a quarter-wave plate, and an objective lens to impinge on an optical disc thereby forming a light spot thereon. The light is then reflected from the disc and this reflected light passes through the objective lens and the quarter-wave plate and its direction of advancement is altered by the beam splitter to move into a convergent lens. Then, as the reflected light further advances, it is partly blocked by a tracking error detecting sensor and the remaining non-blocked portion of the reflected light impinges upon a focusing error detecting sensor. The objective and convergent lenses have $f_0$ and $f_1$ as their focal distances, respectively, and, preferably, ratio $f_0/f_1$ is set equal to or larger than approximately 10.

8 Claims, 12 Drawing Figures

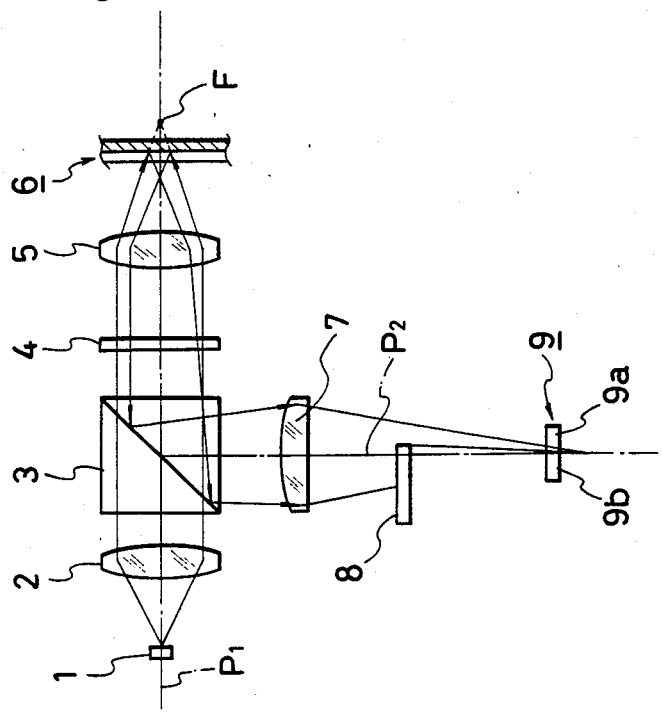
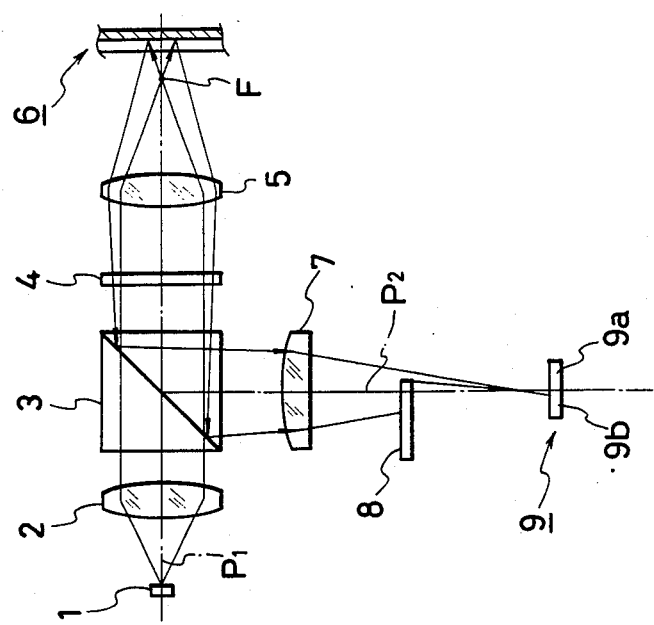

FIG.5
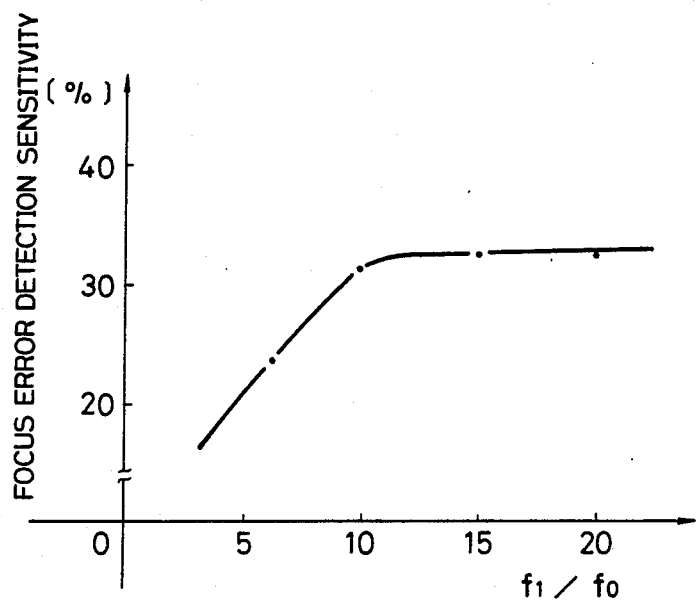
FIG.6a   FIG.6b   FIG.6c
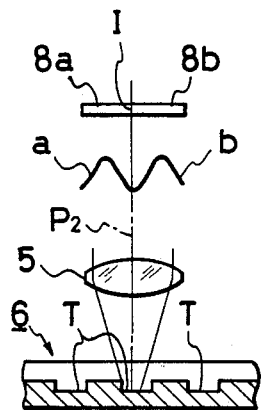 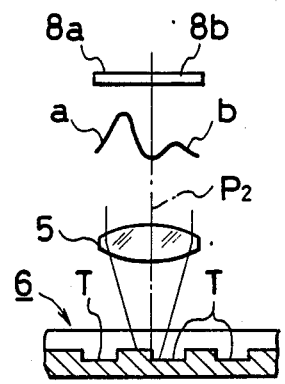 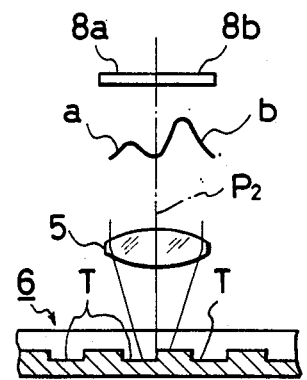

OPTICAL PICK-UP DEVICE FOR BOTH FOCUS AND ERROR TRACKING DETECTION

BACKGROUND OF THE INVENTION

1. Field of the Invention

This invention relates to an optical information detecting device, and, in particular, to an optical pick-up device suitable for use in an optical disc memory system.

2. Description of the Prior Art

An optical pick-up device for use in an optical disc memory system is well known in the art. Such an optical pick-up device is provided for storing or retrieving information on or from a recording disc. For this purpose, use is typically made of a laser light source which emits a laser beam which is caused to impinge on the recording disc through the optical pick-up device. Since there is a relative movement between the recording disc and the optical pick-up device, and the laser beam is required to be focused on the recording disc at all times, the optical pick-up must be capable of detecting a focusing error. Based on such a detected focusing error, the relative distance between the optical pick-up and the recording medium is adjusted so as to maintain the required focusing condition. A knife-edge scheme is typically used in such an optical pick-up device and a prior art pick-up device employing such a knife-edge scheme for detecting a focusing error is disclosed, for example, in Japanese Laid-Open Pub. No. 58-70434.

In detecting a focusing error in such an optical pick-up device, there are two key factors: high sensitivity and broad detecting range. That is, the higher the sensitivity in detecting a focusing error, the finer the focusing control, and the broader the detecting range, the more stable the focusing control. There has been a need to develop a novel optical pick-up capable of detecting a focusing error at high sensitivity over a broader detecting range.

SUMMARY OF THE INVENTION

The disadvantages of the prior art as described above have been obviated by the present invention, which has as its main object to provide an improved optical pick-up device capable of detecting a focusing error at high sensitivity over a broader detecting range.

Another object of the present invention is to provide an improved optical pick-up device suitable for use in an optical disc memory system.

A further object of the present invention is to provide an improved optical pick-up device high in accuracy and reliable in the operation of detecting a focusing error. Other objects, advantages and novel features of the present invention will become apparent from the following detailed description of the invention when considered in conjunction with the accompanying drawings.

BRIEF DESCRIPTION OF THE DRAWINGS

FIGS. 4a and 4b are schematic illustrations which are useful for explaining the focusing error detecting operation of the optical pick-up device shown in FIG. 1;

FIG. 5 is a graph showing the relation between the focusing error detecting sensitivity and the focal distance ratio $f_1/f_0$ of the lenses 5 and 7 shown in FIG. 1;

FIGS. 6a through 6c are schematic illustrations which are useful for explaining the tracking error detecting operation of the optical pick-up device shown in FIG. 1;

DESCRIPTION OF THE PREFERRED EMBODIMENTS

Figure 1:
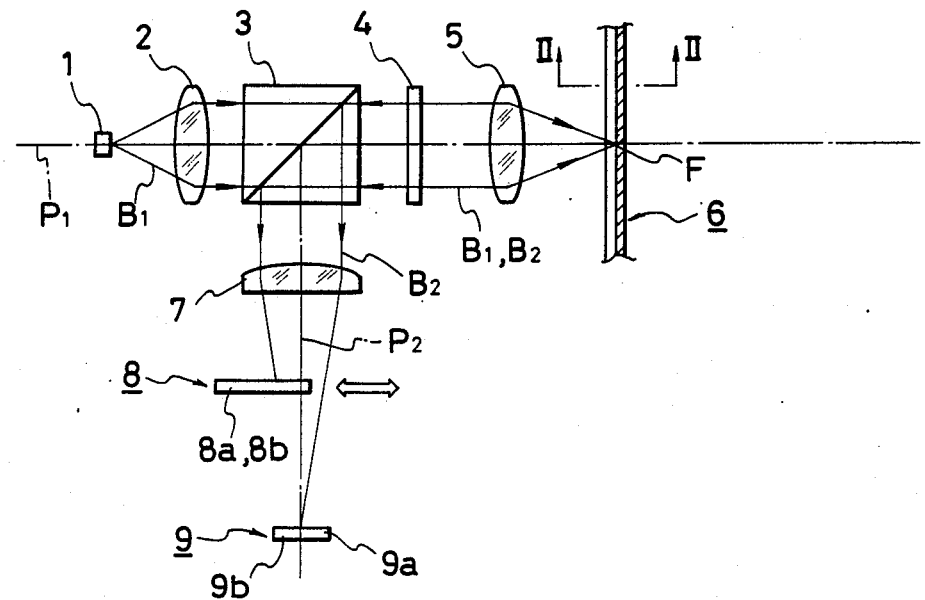
FIG. 1 is a schematic illustration showing an optical pick-up device constructed in accordance with one embodiment of the present invention.

Referring now to FIG. 1, there is schematically shown an optical pick-up device constructed in accordance with one embodiment of the present invention as applied to an optical disc memory system. It will be easily understood that the optical pick-up device shown in FIG. 1 has a knife edge structure for detecting a focusing error. As shown, the optical pick-up device includes a light source 1, which is preferably comprised of a semiconductor laser unit, as disposed in alignment with a main optical axis $P_1$. A coupling lens 2 is disposed to receive light emitted from the laser unit 1 where the light is collimated as passing therethrough. Also disposed as aligned in the main optical axis $P_1$ is a beam splitter 3 which receives the collimated light from the coupling lens 2 and causes the thus received light to pass therethrough without alternation along the main optical axis $P_1$. Also disposed in alignment with the main optical axis $P_1$ are a quarter-wave plate 4 and an objective lens 5 which is disposed against the surface of an optical disc 6.

Figure 2:
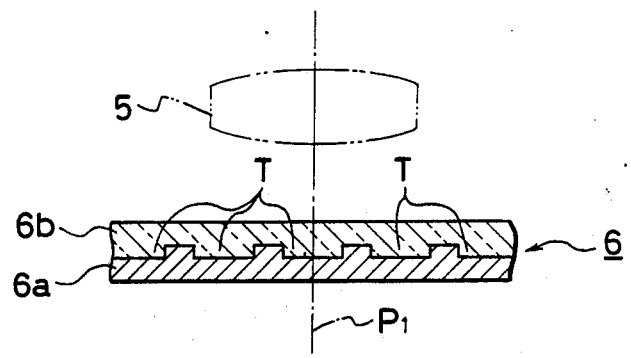
FIG. 2 is a a schematic, cross-sectional view showing the structure of the optical disc 6 shown in FIG. 1.

The optical disc 6 is normally supported to move relative to the optical pick-up device with its surface kept perpendicular to the main optical axis $P_1$. As shown in FIG. 2, the optical disc 6 includes a recording medium 6a having a main surface in which a plurality of recording tracks T are formed at equal intervals and a transparent cover layer 6b for protection. Desired information may be stored along the track T.

Thus, the light emitted from the laser unit 1 passes through the lens 2, beam splitter 3, quarter-wave plate 4, and lens 5 to impinge upon the optical disc 6. And the light reflected from the optical disc 6 passes through the lens 5 and the quarter-wave plate 4 and it is directed to advance along an auxiliary optical axis $P_2$ which is perpendicular to the main optical axis $P_1$ by the beam splitter 3. A convergent lens 7 is disposed in alignment with the auxiliary optical axis $P_2$ and it causes the parallel light from the beam splitter 3 to converge as the light passes therethrough. Also disposed in alignment with the auxiliary optical axis $P_2$ is a tracking error detecting photoelectric sensor 8 which has one edge serving as a knife edge. The tracking error detecting photoelectric sensor 8 is comprised of a pair of photoelectric elements 8a and 8b which are disposed side-by-side with respect to a line which is in parallel with the track T at the point of impingement of laser beam. As will be described later, a tracking error detecting signal is produced by taking a difference between the outputs from the pair of photoelectric elements 8a and 8b. Also disposed in alignment with the auxiliary optical axis $P_2$ is a focusing error detecting photoelectric sensor 9 which is normally located at the focal distance of the convergent lens 7. The focusing error detecting sensor 9 is also comprised of a pair of photoelectric elements 9a and 9b which are disposed side-by-side with its line of division in parallel with the knife edge of the tracking error sensor 8. As will become clear later, a focusing error signal is produced as a difference between the outputs from the pair of photoelectric elements 9a and 9b.

Figure 3:
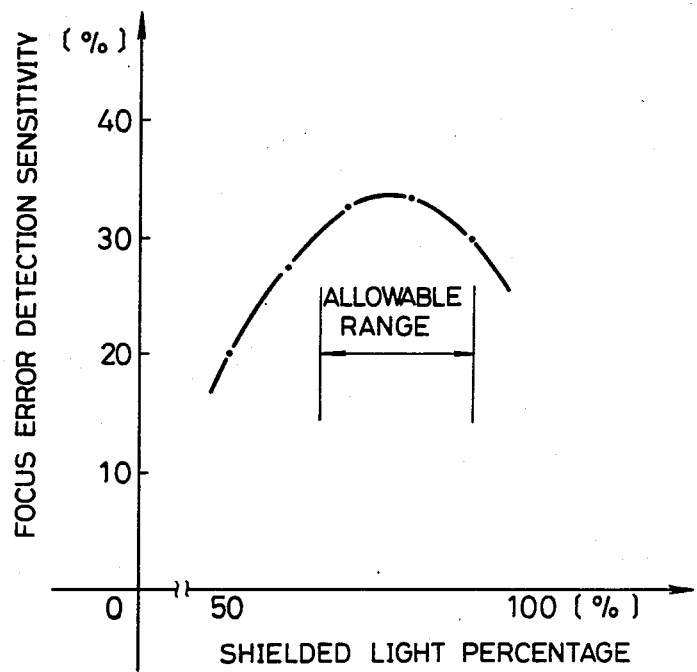
FIG. 3 is a graph showing the relation between the shielded light percentage and the focusing error detecting sensitivity in the optical pick-up device showing in FIG. 1.

The knife edge of the tracking error detecting sensor 8 may be located in alignment with the auxiliary optical axis $P_2$. However, in order to further increase the sensitivity in detecting a focusing error, it is better to locate the knife edge had better be located at an optimal position as in the following manner. That is, as shown in FIG. 3, the sensitivity in detecting a focusing error varies as the amount of light shielded by the sensor 8 varies. As is obvious, more light is shielded as the sensor is moved with its knife edge located to the right of the auxiliary optical axis $P_2$ as illustrated in FIG. 1. It is seen from the graph of FIG. 3 that the focusing error detecting sensitivity can be said to fall from a peak state for a range of 70 to 80 shielded light percentage. Since an allowable range may be defined by taking into 10% reduction of the peak state of the focusing error detecting sensitivity, the allowable range of shielded light percentage becomes 65–90%. It is thus clear that if the sensor 8 is located to block the light from the lens 7 such that the percentage of shielded light ranges between 65–90%, there can be obtained a further increased sensitivity in detecting a focusing error. In this case, therefore, the sensor 8 is located with its knife edge positioned to the right of the auxiliary optical axis $P_2$ as viewing into FIG. 1.

Now, also with reference to FIGS. 4a and 4b, the principle of focusing error detecting operation will be briefly described herein below. FIG. 1 indicates the condition in which the optical disc 6 is properly located at the focal distance F of the objective lens 5. Under that condition, each of the pair of photoelectric elements 9a and 9b constituting the two-part focusing error detecting sensor 9 receives the same amount of light. Thus, the difference between the outputs from the respective photoelectric elements 9a and 9b is zero. However, as shown in FIG. 4a, if the optical disc 6 is located far away from the focal distance F of the objective lens 4, the photoelectric element 9b will receive more light than the photoelectric element 9a. As a result, a difference signal produced from the outputs from the respective photoelectric elements 9a and 9b, for example, will be negative in value thereby indicating the fact that the optical disc 6 is located far away from the focal distance F of the objective lens 5. On the other hand, as shown in FIG. 4b, if the optical disc 6 is located closer to the objective lens 5 with respect to the focal distance F thereof, the photoelectric element 9a will receive more light than the photoelectric element 9b so that there is produced a difference signal which is opposite in polarity, i.e., positive in this example, thereby indicating the fact that the optical disc 6 is located too close to the objective lens 5.

Such a difference signal constitutes a focus error detecting singal wherein the sign of this signal indicates if the optical disc 6 is too close or too far and the magnitude of this signal indicates how far away the optical disc 6 is located from the focal point F of the objective lens 5. Such a focus error detecting signal is then supplied to a servomechanism (not shown) for changing the relative positional relation between the objective lens 5 and the optical disc 6 along the main optical axis $P_1$. For example, the optical pick-up device, or the objective lens 5 is moved along the main optical axis $P_1$ until the focal point F comes to be located properly at the optical disc 6. It is to be noted that designating outputs from the photoelectric elements 9a and 9b by A and B, respectively, A−B defines a focusing error signal, and the focusing error detecting sensitivity may be defined as $(A-B)/(A+B)$.

Now, the focusing error detecting sensitivity depends not only on the above-described light shielding percentage, but also on the focal distance ratio between the lenses 5 and 7. FIG. 5 shows how the focusing error detecting sensitivity varies as a function of the focal distance ratio between the lenses 5 and 7. It is to be noted that $f_0$ indicates the focal distance for the lens 5 and $f_1$ indicates the focal distance for the lens 7. It can be easily seen from the graph of FIG. 5 that the focusing error detecting sensitivity saturates approximately at $f_0/f_1 = 10$. It is thus clear that the focal distance ratio $f_0/f_1$ between the lenses 5 and 7 should be set approximately at 10 or more so as to obtain an increased focusing error detecting sensitivity.

In operation, as shown in FIG. 1, the light $B_1$ emitted from the semiconductor laser unit 1 is collimated as it passes through the coupling lens 2 and the thus collimated light passes through the beam splitter 3 and then the quarter-wave plate 4. Then, this light is focused onto track T of the optical disc 6 as it passes through the objective lens 5 thereby forming a light spot having a diameter of approximately 1.0 micron. Then, the light $B_2$ reflected from the optical disc 6 passes through the objective lens 5 and the quarter-wave plate 4 this time in the reversed direction along the main optical axis $P_1$ and this reflected light $B_2$ is then forced to advance along the auxiliary optical axis $P_2$ by the beam splitter 3. And, thus, the light $B_2$ is converted into a convergent light beam as it passes through the lens 7. This convergent light beam is then partly blocked by the tracking error detecting sensor 8 and the remaining non-blocked light impinges upon the focus error detecting sensor 9.

Now, the tracking operation will be briefly described with particular reference to FIGS. 6a through 6c. In the first place, as shown in FIG. 6a, if the optical axis $P_2$ of the convergent light beam from the objective lens 5 is located at the center of the track T, i.e., normal tracking condition, the reflected light beam $B_2$ impinges upon the pair of tracking error detecting photoelectric elements 8a and 8b located on both sides of a division line l equally in amount. Thus, the outputs from the respective photoelectric elements 8a and 8b are equal in level so that the difference between these outputs, which define a tracking error signal, is at zero level, thereby indicating the normal tracking condition. Then, as shown in FIG. 6b, if the optical axis $P_2$ of the convergent light beam form the objective lens 5 is shifted to the left from the center of track T, the photoelectric element 8a will receive more light than the photoelectric element 8b, and, thus, for example, there is obtained a positive difference signal or tracking error signal. On the other hand, as shown in FIG. 6c, if the optical axis $P_2$ is shifted to the left, there is obtained a negative tracking error signal. Then, such a tracking error signal is supplied to a servomechanism (not shown) so that the optical pick-up device or the objective lens 5 is moved in the direction perpendicular to the track T of the optical disc 6 until the tracking error signal comes within a predetermined range. For example, such a tracking error correcting operation is preferably carried out until the shift of the optical axis $P_2$ is within $\pm 0.1$ microns from the center of the track T.

Figure 7:
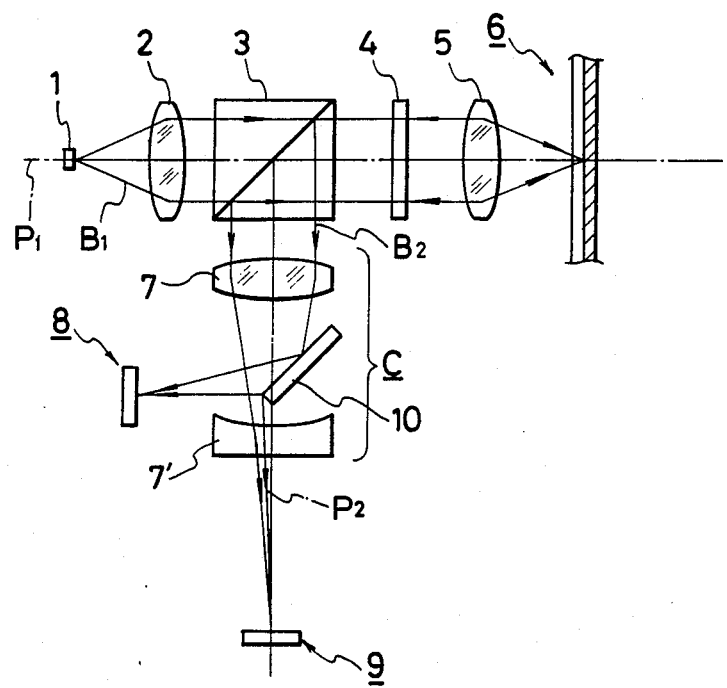
FIG. 7 is a schematic illustration showing an optical pick-up device constructed in accordance with another embodiment of the present invention.

Now, another embodiment of the present invention will be described with reference to FIG. 7. It is to be noted, however, that like numerals are used to indicate like elements and those elements which have already been described before will not be described again. The optical pick-up device shown in FIG. 7 is similar in many respects to the optical pick-up device shown in FIG. 1. However, in the structure shown in FIG. 7, use is made of a composite lens system C comprised of convex lens 7 and concave lens 7' and use is made of a mirror 10 for directing part of the light beam $B_2$ toward the tracking error detecting sensor 8 which is located outside of the optical path for the light beam $B_2$. In this structure, the focal distance of the composite lens system C corresponds to the before-mentioned focal distance $f_1$. The mirror 10 is disposed as appropriately inclined to cause part of the light beam $B_2$ to be directed in the direction approximately perpendicular to the optical axis of the light beam $B_2$. Thus, the left edge of the mirror 10 serves as a knife edge in this case and the that portion of the light beam $B_2$ which has not been reflected by the mirror 10 impinges upon the focusing error detecting sensor 9 after passing through the concave lens 7'. This structure is advantageous because the focal distance $f_1$ may be set larger easily as compared with the case of using the convergent lens 7 alone, thereby allowing to make the entire structure compact in size.

Figure 8:
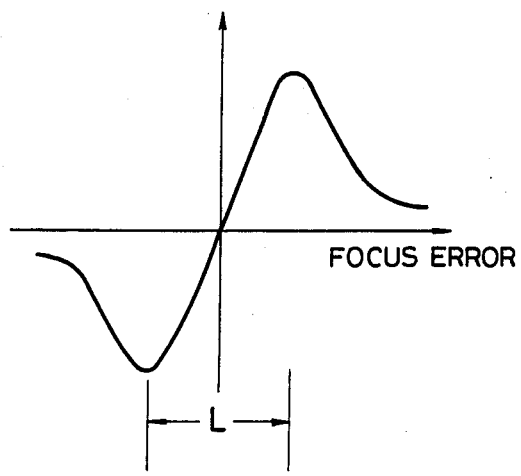
FIG. 8 is a graph showing how a focusing error signal changes its amplitude as a function of a focus error.
Figure 9:
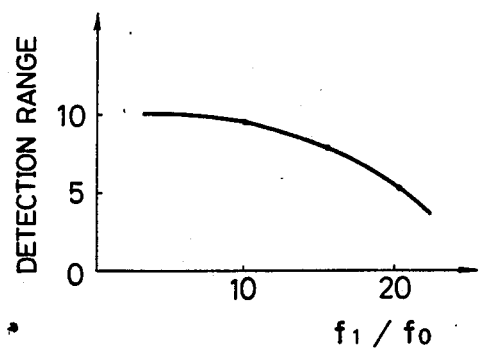
FIG. 9 is a graph showing the relation between the focusing error detecting range and the focal distance ratio $f_1/f_0$.

Now, the focusing error signal varies as a function of focus error as qualitatively shown in FIG. 8. That is, the focusing error signal increases at first as the focus error increases; however, the focusing error signal reaches a maximum and then it decreases even if the focus error further increases. As described previously, when there is a focusing error, the optical pick-up device or the objective lens 5 is moved by means of a servomechanism with respect to the optical disc 6 depending on the amount of such focusing error so as to bring the optical pick-up device into the in-focus state. However, such a servomechanism can operate stably if the focusing error is in a range L as indicated in FIG. 8, i.e., in the range of focusing error between the minimum and maximum of the focusing error signal. A half of this range L, i.e., L/2, is called a detection range. The value of L is required to be at least 10 microns from the viewpoint of stability in focusing control operation, which thus requires the detection range to be 5 microns at minimum. Such a detection range tends to decrease as the focal distance ratio $f_1/f_0$ increases. And it has been found experimentally that this detection range does gradually decrease as $f_1/f_0$ increases as graphically shown in FIG. 9. According to this finding, it can be said that $f_1/f_0$ should be set approximately at 20 or less so as to obtain stability in the focusing control operation.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. An optical pick-up device comprising:
   a light source for emitting light;
   a first optical system for guiding said light along a first direction to impinge on an object and guiding a reflected light from said object to advance in a second direction which is different from said first direction, said first optical system including a first lens aligned with said first direction and opposite to object thereby forming a light spot thereon;
   a second optical system disposed in alignment with said second direction for receiving said reflected light from said first optical system, said second optical system including a second lens which causes said reflected light to be convergent along said second direction;
   tracking error detecting means having one side edge defined as a knife edge for receiving part of said reflected light;
   focusing error detecting means disposed downstream of said tracking error detecting means with respect to an advancing direction of said reflected light along said second direction for receiving that portion of said reflected light which is not received by said tracking error detecting mean; and
   whereby said first and second lenses have focal distances $f_0$ and $f_1$, respectively, which satisfy the condition that $f_0/f_1$ is equal to or larger than approximately 10.

2. The device of claim 1 wherein $f_1/f_0$ also satisfies the condition of being equal to or smaller than approximately 20.

3. The device of claim 1 wherein the amount of reflected light received by said tracking error detecting means ranges between 65 and 90% of the total amount of said reflected light.

4. The device of claim 1 wherein said tracking error detecting means includes a first photodetector comprised of a pair of first photoelectric elements which are disposed side-by-side on both sides of a first dividing line.

5. The device of claim 4 wherein said first photodetector is disposed partly in an optical path for said reflected light along said second direction, wherein one edge of said first photodetector serves as the knife edge of said tracking error detecting means.

6. The device of claim 4 wherein said first photodetector is disposed outside of an optical path for said reflected light along said second direction and said device further comprises a mirror disposed to direct part of said reflected light advancing along said second direction toward said first photodetector.

7. The device of claim 4 wherein said focusing error detecting means includes a second photodetector comprised of a pair of second photoelectric elements which are disposed side-by-side on both sides of a second dividing line which is perpendicular to said first dividing line.

8. The device of claim 1 wherein said second optical system further includes a concave lens located in alignment with said second direction wherein said focal distance $f_1$ is defined as a focal distance of a combination of said second lens and said concave lens.

* * * * *